UNITED STATES PATENT OFFICE 2,175,113

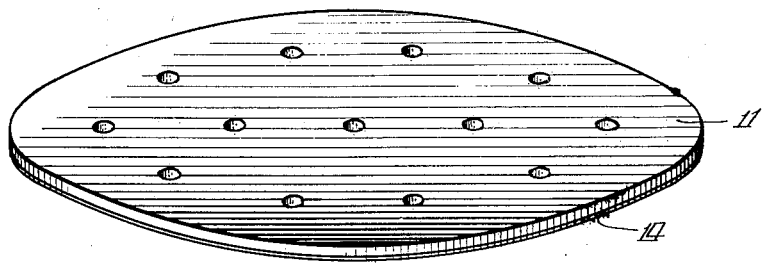
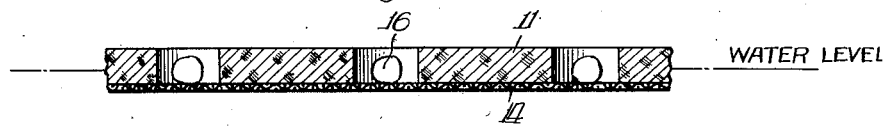
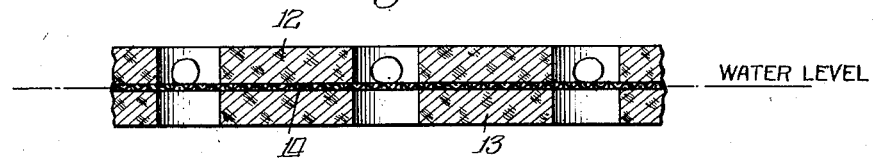
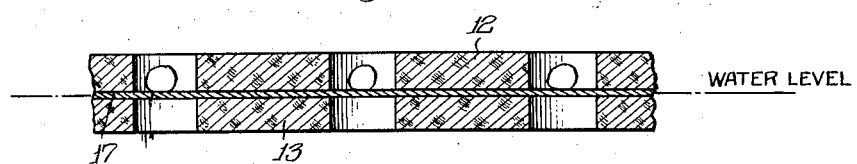
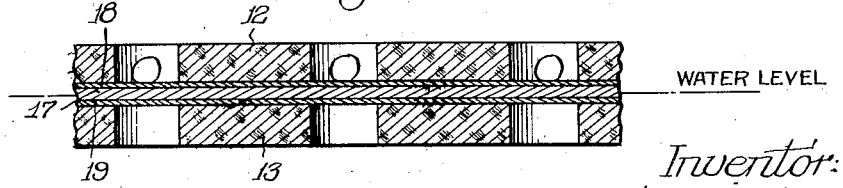

SEED GERMINATING WAFER

Albert C. Fischer, Chicago, Ill.

Application August 28, 1936, Serial No. 98,350

17 Claims. (Cl. 47—14)

This invention relates to a seed germinating wafer for the purpose of seed testing as to the germinating qualities; also a seed germinating device in which the seed is hastened in its germinating qualities.

Fig. 1 is a perspective view of one form of my invention chosen for illustration. Fig. 2 is a fragmentary sectional view of the same. Figs. 3, 4 and 5 are corresponding fragmentary sectional views of modifications of the invention.

My invention comprehends one or two discs of a floatable material such as cork having perforations approximately one-quarter inch in diameter, or larger if desired, in which seeds can be placed to rest upon a supporting membrane attached to the floatable material. Either one disc 11 (Figs. 1, 2) or two discs 12 and 13 (Figs. 3-5) might be used in the formation of the wafer and the discs are preferably one-eighth of an inch in thickness and eight to ten inches in diameter, or larger if desired. I cement a piece of cheese cloth 14, flannel or other suitable fibre or gauze-like product on the underside of the disc for the purpose of closing the bottoms of the perforations and thereby to provide a support for the seeds. On this gauze-like base, which becomes the floor of the apertures in the disc, I deposit the seeds 16 to be germinated and tested. I then deposit this wafer on a water surface and the cork disc being light in weight will at all times stay upon the surface of the water and permit the seed to be just enough in contact with the water to facilitate its germination. Heretofore in using clay discs and other methods, such as placing seed on cotton immersed in water, it has been necessary to continuously watch and regulate the water level, but with my improved invention this is overcome because the disc will permit the same moisture evenly to the seed until the water in which the disc is contained is finally dried out. It can readily be understood how very much time will be saved in not continually having to watch the water level or the water in the container because of this floating germinating disc.

Where it is desirable not to have the seed in contact with the water I place a light disc 13 under the upper disc, with the lower disc, fabric or gauze 14, whatever may be used, in the center and thus keep the seed out of the water but in intimate relationship thereto and in a definite spaced relation from the water at all times, whereby an air pocket or an air cushion is formed between the surface of the water and the seed. I therefore avoid constant changes in temperature and degrees of moisture and facilitate germination of the seed. It can be readily understood that maintaining the seed in a definite relationship to the water must be greatly superior to a condition in which the seed is alternately moist and dry. I thus hasten the germination of the seed and by keeping the seed in a healthy state prevent mould and decay.

Another feature of my invention is that this germination wafer may be accomplished by using a film 17 of a colloidal nature either with or without the gauze, the colloid film 17 serving as the supporting membrane for the seeds as shown in Fig. 4 or as an intermediate layer between layers of gauze 18 and 19 as shown in the embodiment of Fig. 5. The colloid film may be a gelatin or glue membrane. This film may come as a part of or separate from the discs and these colloid films may serve various purposes in conjunction with the germination, the hastening of the germination and the development of the seed. By treating this film in various ways, for instance, with an acid, and having it in moist relation with the seed I may rapidly break down the seed shell and hasten germination and may treat this colloid film with a persalt or suitable ingredients which act directly upon the substance in the seed in breaking down resistance to germination and thus hastening germination in this manner. Or I may prepare this film with a soil content so that upon germination of the seed the root may penetrate to a soil base and be germinated and rooted directly into the soil and after leaving off the upper and lower side of the cork disc this film may be separated into pieces and deposited in the ground in planting.

These soil spacers or supports may be treated in various manners and the soil united and mixed in such a manner as to be particularly effective for the particular kind of seed used, viz., some plants require muck soil, others a clay soil, still others a sandy, loam and clay soil, and still others sandy soil, and some may be peat moss, sand and loam. By furnishing thin spacers or supports of this type of soil with colloid coatings or mixed with colloid coatings to retain this form and utilizing them for this seed germinating disc, I facilitate the operations in the greenhouse, the growing of plants, and at the same time that germinating takes place I afford the root a chance to anchor itself in a preliminary soil adapted to that particular type.

My invention therefore relates to either a single or double disc wafer. When a single disc is used the membrane support is cemented to this disc.

When a double disc is used the membrane is placed between the two. The discs are preferably of cork but may be of other materials, such as, wood, fibre board, etc. These wafers may be formed of sponge rubber, preferably one eighth on an inch in thickness, the cells of which either may be or may not be broken. The discs may have a surface skin of rubber or the pores may be exposed. If desirable the discs may be satisfactorily waterproofed. The membrane consists of either a cheese cloth, fabric, linen, flannel, cotton fibre, screening, or any suitable substance which may answer this purpose. Although four different embodiments are illustrated in the drawing it is understood that the features disclosed in each may be adopted in the others, for example, the showing of a colloid film in the embodiment of Fig. 4 may be adopted to the embodiment shown in Figs. 1 and 2 illustrating a single disc with a supporting membrane thereon. In such a modified construction the gauze membrane 14 would be replaced by a colloid layer 17.

Likewise, the support 14 could be substituted for a laminated support of the type shown in Figure 5.

My invention further relates to a colloid film in which the germination hastening chemical is incorporated therewith.

My invention also relates to colloid soil films in which the colloid may have incorporated therein chemicals which hasten seed germinating, or this colloid may contain fertilizers or plant food between these colloid layers or the soil film. Where it is desirable to not use an upper and lower film 18 and 19 but to use the colloid as a binder it may be mixed with the soil proper for the purpose described and in the manner described. It can readily be understood that the soil film will be kept in a moistened condition without being in direct contact with the water.

I claim:

1. A seed germinating wafer having means for floating said wafer on a water surface and a film of germinating soil contacting therewith and adapted to the needs of a particular type of seed for supporting the seed.

2. A seed germinating wafer having means for floating said wafer on a water surface and a film in direct contact with said floating means, underlying the seed and containing chemicals which hasten seed germination.

3. A seed germinating wafer having perforations therein and a support across said perforations in which seeds may lie to germinate in the presence of uniform moisture conditions, and means for floating said wafer on a water surface.

4. A seed germinating wafer having an upper disc, a lower disc and an intermediate upper and lower membrane, said discs being perforated and said membranes having an intermediate coating or film therebetween.

5. A seed germinating wafer composed of a pair of discs having intermediate of the two discs a supporting film for the seeds, said wafer being buoyant on a water surface by virtue of the texture of at least one of said discs.

6. A seed germinating wafer composed of two discs having therebetween a colloid film containing chemicals which hasten seed germination for supporting the seed, said wafer being buoyant on a water surface.

7. A seed germinating wafer composed of a pair of discs having intermediate thereto a colloid film underlying the seeds and having chemicals incorporated therein which effect plant growth, said wafer being buoyant on a water surface.

8. A seed germinating wafer comprising a pair of discs having incorporated between them a soil film underlying the seed for the growth of young plants, said wafer being buoyant on a water surface.

9. A seed germinating wafer comprising a buoyant disc having perforations therein with a supporting membrane across the bottoms of the perforations for the seeds, said wafer adapted for use on a body of water and so constructed that an air pocket lies intermediate of the water and the seeds to be germinated.

10. A seed germinating wafer comprising a perforated disc and a membrane support covering said perforations, said wafer adapted to rest upon a water film and float thereon.

11. A seed germinating wafer composed of superposed discs having intermediate thereof a separating film for supporting seeds to be germinated, said separating film being adapted to lie above an air cushion and float upon a water film.

12. A seed germinating wafer comprising a floatable structure of cylindrical form having perforations therein to act as receptacles for seed, and a member covering the perforations for supporting the seed.

13. A seed germinating wafer comprising in its structure buoyant material having perforations therein and adapted to float in water, said perforations having their lower ends sealed by a suitable film to prevent the seed dropping down thru the perforations into the water.

14. As an article of manufacture, a seed germinating device comprising a floatable member of cylindrical formation having a seed receiving pocket therein extending to a predetermined position with respect to the level of the water in which the member floats whereby a seed in the pocket is constantly subjected to a predetermined degree of mositure.

15. A seed germinating wafer comprising a buoyant disc of cylindrical formation having apertures therein fitted with a support for seeds inserted in said apertures, said wafer adapted to float constantly upon a water surface.

16. A seed germinating wafer comprising a disc of predetermined density whereby the same may float in water, said disc having at least one aperture therein embodying a supporting colloid film thereacross for supporting a seed thereon and incorporating chemicals influencing plant growth.

17. A seed germinating wafer comprising a disc of predetermined density whereby the same may float in water, said disc having apertures therein embodying a supporting colloid soil film having incorporated therein suitable soil combinations for influencing plant growth.

ALBERT C. FISCHER.